(12) United States Patent
Meergans et al.

(10) Patent No.: US 9,586,601 B2
(45) Date of Patent: Mar. 7, 2017

(54) INNER CEILING ASSEMBLY OF A RAILWAY VEHICLE

(71) Applicant: SIEMENS AKTIENGESELLSCHAFT, Munich (DE)

(72) Inventors: Ewald Meergans, Schwabach (DE); Stefan Stephan, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/901,244

(22) PCT Filed: Jun. 18, 2014

(86) PCT No.: PCT/EP2014/062788
§ 371 (c)(1),
(2) Date: Dec. 28, 2015

(87) PCT Pub. No.: WO2014/206823
PCT Pub. Date: Dec. 31, 2014

(65) Prior Publication Data
US 2016/0144872 A1 May 26, 2016

(30) Foreign Application Priority Data

Jun. 27, 2013 (DE) .......................... 10 2013 212 454

(51) Int. Cl.
*B61D 17/12* (2006.01)
*B61D 17/00* (2006.01)
(Continued)

(52) U.S. Cl.
CPC .............. *B61D 17/00* (2013.01); *B61D 1/00* (2013.01); *B61D 17/12* (2013.01); *B61D 17/18* (2013.01);
(Continued)

(58) Field of Classification Search
CPC ........ B61D 17/00; B61D 17/12; B61D 17/18; B61D 27/00; B61D 29/00; B61D 1/00; B60H 1/00371
See application file for complete search history.

(56) References Cited

U.S. PATENT DOCUMENTS 3,655,961 A * 4/1972 Hover ....................... E04B 9/02
362/149
3,967,385 A * 7/1976 Culbertson ............... F26B 3/28
165/104.14
(Continued)

FOREIGN PATENT DOCUMENTS

DE 202008015417 A1 2/2009
DE 102007051858 A1 5/2009
(Continued)

*Primary Examiner* — Jeanette E Chapman
(74) *Attorney, Agent, or Firm* — Laurence Greenberg; Werner Stemer; Ralph Locher

(57) ABSTRACT

A rail-borne vehicle includes an inner ceiling assembly having at least one air duct, a multiplicity of lighting devices and at least one ceiling cladding. The air duct is disposed between an inner surface or face of a roof of the rail-borne vehicle and the ceiling cladding and the air duct is provided with a multiplicity of air outlet openings. The ceiling cladding also has a multiplicity of openings. Both the lighting devices disposed between the inner surface of the roof of the rail-borne vehicle and the ceiling cladding as well as the air outlet openings of the air duct are disposed relative to the openings in the ceiling cladding in such a way that both the air of the air duct and the light of the lighting devices pass through the openings in the ceiling cladding.

9 Claims, 1 Drawing Sheet

(51) Int. Cl.
  *B61D 17/18*   (2006.01)
  *B61D 27/00*   (2006.01)
  *B61D 29/00*   (2006.01)
  *B61D 1/00*    (2006.01)
  *B60H 1/00*    (2006.01)
(52) U.S. Cl.
  CPC ............ *B61D 27/00* (2013.01); *B61D 29/00* (2013.01); *B60H 1/00371* (2013.01)

(56) References Cited

U.S. PATENT DOCUMENTS

| | | | | |
|---|---|---|---|---|
| 4,283,451 | A | * | 8/1981 | Abrahami ................. E04C 2/54 156/71 |
| 5,136,486 | A | * | 8/1992 | Burkarth ............ B60H 1/00371 362/149 |
| 2010/0087130 | A1 | * | 4/2010 | Nitsche .............. B60H 1/00371 454/76 |
| 2014/0087645 | A1 | | 3/2014 | Hoefler et al. |

FOREIGN PATENT DOCUMENTS

| DE | 102009058413 A1 | 6/2011 |
|---|---|---|
| WO | 2009074531 A1 | 6/2009 |
| WO | 2012156272 A1 | 11/2012 |

* cited by examiner

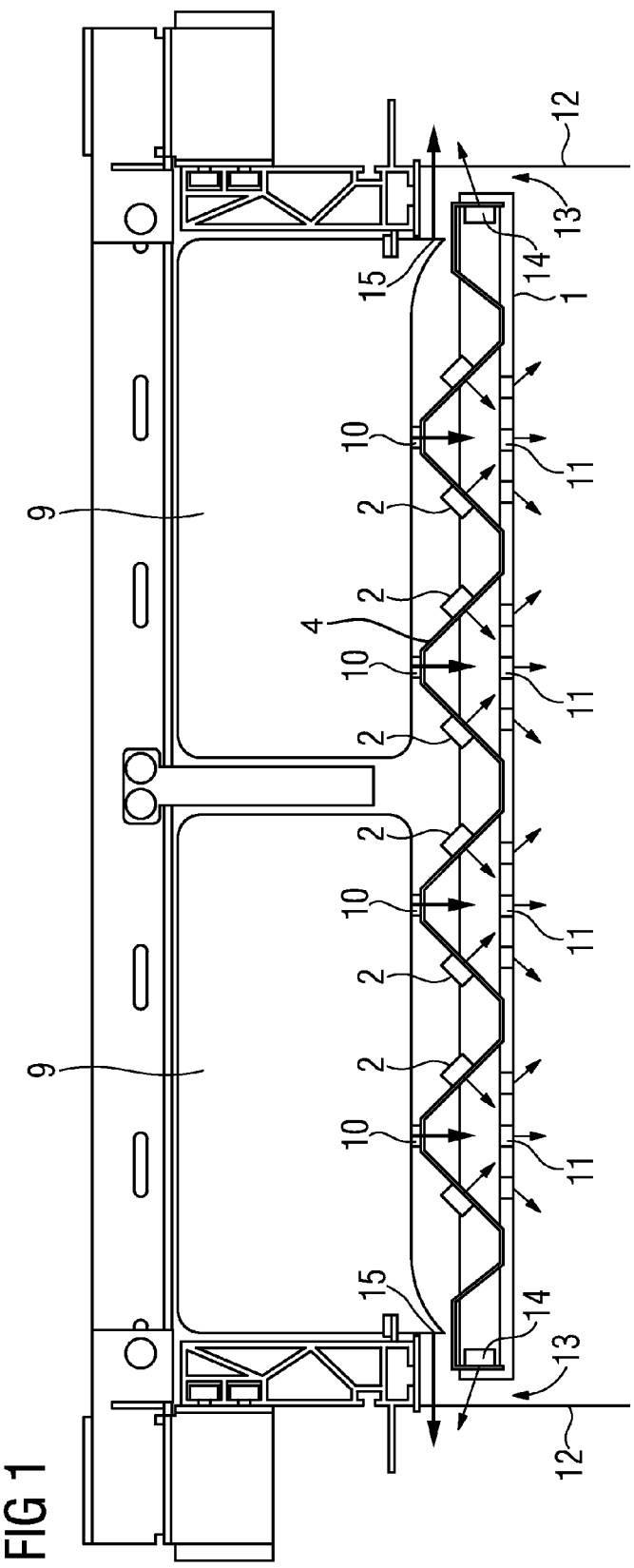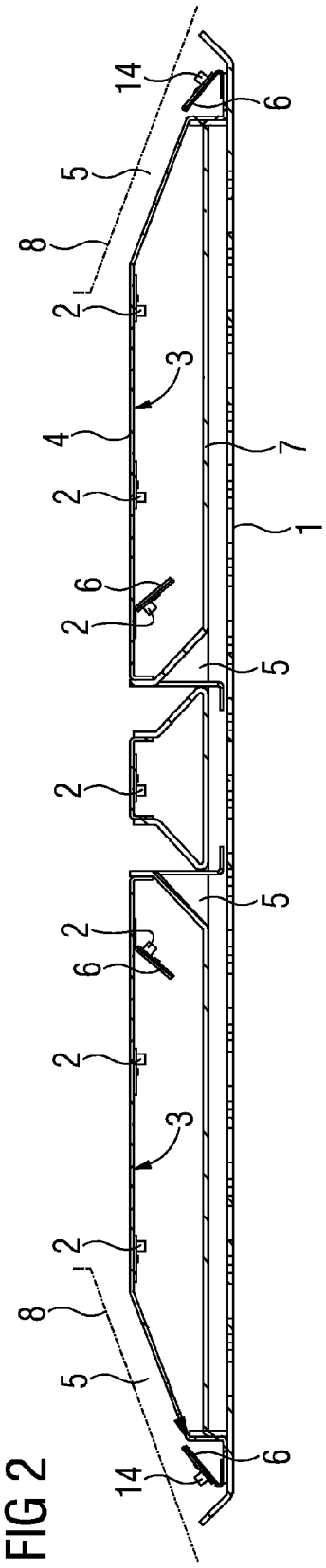

INNER CEILING ASSEMBLY OF A RAILWAY VEHICLE

BACKGROUND OF THE INVENTION

Field of the Invention

The invention relates to a rail-borne vehicle having an inner ceiling assembly that comprises as components at least one air duct, multiple illuminating means and at least one ceiling cladding, wherein the air duct is provided with multiple air outlet openings and is arranged between an inner face of a roof of the rail-borne vehicle and the ceiling cladding, and wherein the ceiling cladding comprises multiple openings to enable the passage of air from the air outlet openings of the air duct.

DE 10 2009 058 413 A1 illustrates an inner ceiling assembly of a rail-borne vehicle that is used in passenger transport and comprises a ceiling cladding in which two strips of lamps are integrated. The spacing of the strips of lamps is predetermined by means of the width of a space that comes into contact with the air.

BRIEF SUMMARY OF THE INVENTION

The object of the invention is to render it possible to provide a homogenous illumination of the inner compartment of a rail-borne vehicle.

The object is achieved by virtue of the subject matter described below. Further developments and embodiments of the invention are disclosed in the other features described below.

The rail-borne vehicle in accordance with the invention, in particular a rail-borne vehicle used in passenger transport, comprises an inner ceiling assembly that comprises as components at least one air duct, multiple illumination means and at least one ceiling cladding. The air duct is provided with multiple air outlet openings and is arranged between an inner face of a roof of the rail-borne vehicle and the ceiling cladding. The ceiling cladding comprises multiple openings, in particular to enable the passage of air from the air outlet openings of the air duct. The air outlet openings of the air duct are arranged with respect to the openings of the ceiling cladding in such a manner that air from the air duct passes through the openings of the ceiling cladding. Furthermore, the illuminating means is arranged in accordance with the invention between the inner face of the roof of the rail-borne vehicle and the ceiling cladding in such a manner that light from the illuminating means also passes through the openings of the ceiling cladding. It is not mandatory that air and light pass through each opening of the ceiling cladding. Nonetheless, the ceiling cladding comprises multiple openings through which pass both air from the air duct and also light from the illuminating means. The ceiling cladding is used furthermore as cladding of the at least one air duct.

By virtue of the arrangement in accordance with the invention of the illuminating means and the air outlet openings of the air duct with respect to the openings, a strict separation between ventilation and illumination is abolished. It is possible to considerably reduce the spacings of the illuminating means with respect to one another and provide an associated, homogenous illumination of the inner compartment, by way of example of a passenger compartment of the rail-borne vehicle, without limiting the ventilation of the inner compartment of the rail-borne vehicle.

In accordance with a further development of the invention, the openings of the ceiling cladding are arranged distributed in a uniform manner over the ceiling cladding.

A further development of the invention provides that a carrier plate for the illuminating means is arranged between the inner face of the roof of the rail-borne vehicle and the ceiling cladding and said carrier plate comprises openings for conveying air from the air outlet openings of the air duct. The illuminating means are arranged in particular on the carrier plate, in particular integrated in the carrier plate, in such a manner that the light from the illuminating means is radiated in the direction of a face of the ceiling cladding that is facing the inner face of the roof of the rail-borne vehicle. The carrier plate is arranged in particular between the at least one air duct and the ceiling cladding. In accordance with the embodiment, air from the air duct passes through the openings of the ceiling cladding and light from the illuminating means illuminates said openings.

The ceiling cladding is further embodied with respect to the illuminating means in such a manner that the ceiling cladding is at a spacing of at least 10 mm, in particular 30 mm. If the illuminating means are arranged on the carrier plate, the spacing between the carrier plate and the ceiling cladding amounts accordingly to at least 10 mm.

It is possible by virtue of selecting the size of the openings of the ceiling cladding and by virtue of selecting the spacing of the illuminating means from the ceiling cladding and by virtue of selecting the size of the illuminating means to illuminate indirectly the compartment that is to be illuminated. By way of example, the illuminating means is arranged with respect to the openings of the ceiling cladding in such a manner that the compartment that is illuminated by the illuminating means, by way of example a passenger compartment of the rail-borne vehicle, is to a great extent illuminated indirectly below the ceiling cladding.

Alternatively, the illuminating means are arranged by way of example on the face of the ceiling cladding that is facing the inner face of the roof of the rail-borne vehicle so that light is radiated in the direction of the inner face of the roof of the rail-borne vehicle. Nonetheless, reflections cause light from the illuminating means to pass through the openings of the ceiling cladding. This can also be described as indirect illumination.

In a further embodiment, it is provided that a pane of frosted glass is arranged between the illuminating means and the ceiling cladding. The illuminating means are by way of example arranged on the carrier plate and light is radiated in the direction of the ceiling cladding. In order to achieve a soft illumination of the inner compartment of the rail-borne vehicle and consequently to produce a similar effect to that of indirect illumination, a necessarily transparent material, by way of example a phototropic or electrotopic glass, in particular in the form of a pane, is arranged between the illuminating means and the ceiling cladding. The frosted glass comprises by way of example a polycarbonate material.

The illuminating means are in particular light emitting diodes, in short LED.

In a further development, the rail-borne vehicle comprises a gap between the ceiling cladding and at least an inner face of a side wall of the rail vehicle, wherein both the illuminating means and also the air outlet openings of the air duct are arranged with respect to the gap between the ceiling cladding and at least one inner face of a side wall of the rail-borne vehicle in such a manner that both air from the air duct and also light from the illuminating means can pass through the gap between the ceiling cladding and the inner face of the side wall of the rail-borne vehicle. It is also possible for light from the illuminating means to be radiated not directly into the inner compartment of the rail-borne vehicle but rather by way of example in the direction of the inner face of the side wall of the rail-borne vehicle, as a consequence of which the inner compartment of the rail-borne vehicle would in turn be illuminated indirectly.

In a further development, the ceiling cladding and the illuminating means form one unit that is easy to assemble. This is pre-assembled accordingly prior to installation in the rail-borne vehicle. In particular, the ceiling of the rail-borne vehicle comprises multiple structurally-identical units, so-called ceiling cladding modules. In addition to comprising ceiling cladding and the integrated illuminating means, said ceiling cladding modules can comprise means for fastening the entire unit, in particular to the roof of the rail-borne vehicle, and also means for connecting the illuminating means in an electrical manner. Where appropriate, the entire electrical system and electronic system for the illuminating means and possible plug connections can also be integrated. Such an easy-to-assemble unit is by way of example merely screwed on and plugged in during its complete assembly.

BRIEF DESCRIPTION OF THE SEVERAL VIEWS OF THE DRAWING

The invention can include numerous embodiments. The invention is further explained with reference to the following figures in which in each case an exemplary embodiment is illustrated. Like elements in the figures are provided with like reference numerals.

FIG. 1 illustrates schematically a cross-sectional view of a first embodiment of an inner ceiling assembly in accordance with the invention for a rail-borne vehicle, FIG. 2 illustrates a cross-sectional view of a further embodiment of an inner ceiling assembly for a rail-borne vehicle.

DESCRIPTION OF THE INVENTION

FIG. 1 illustrates schematically a cross-sectional view of a first embodiment of an inner ceiling assembly in accordance with the invention in an assembled state for a rail-borne vehicle. The cross-section extends perpendicular with respect to the longitudinal axis of the rail-borne vehicle.

The inner ceiling assembly comprises a ceiling cladding 1 and two air ducts 9 that extend parallel to the longitudinal axis of the rail-borne vehicle, wherein said air ducts are arranged between an inner face of a roof of the rail-borne vehicle and the ceiling cladding 1 and are provided with multiple air outlet openings 10. The ceiling cladding 1 is in this case embodied in a planar manner.

A trapezoidal sheet as a carrier plate 4 is arranged between the air ducts 9 and the ceiling cladding 1. The carrier plate 4 has a cross-section in the form of four adjacent-lying isosceles trapeziums.

The carrier plate 4 comprises in the illustrated cross-section four adjacent-lying openings for conveying air from the air outlet openings of the air duct, which are arranged in line with the air outlet openings 10 of the two air ducts 9 so that the air passes out of the air ducts 9 through the openings of the carrier plate 4. The openings of the carrier plate 4 have not been provided with reference numerals for the sake of clarity. They are arranged in each case on the upper base face of the isosceles trapezium and the carrier plate 4 contacts in this case the air ducts 9 with said upper base faces.

In addition, multiple illuminating means 2 are arranged on the carrier plate 4. The illuminating means 2 are arranged in this case on the limbs of the isosceles trapeziums and emit light in the direction of the ceiling cladding 1. The isosceles trapeziums comprise in each case a lower base face that is open in the downwards direction. This lower base face is also referred to as the base. They are consequently embodied so as to be open towards the ceiling cladding 1.

The ceiling cladding 1 is likewise provided with many openings 11 through which pass air from the air ducts 4 and also light from the illuminating means 2, which is indicated in each case by arrows. Both the illuminating means 2 and also the air outlet openings 10 of the air ducts 9 are arranged corresponding to the openings 11 of the ceiling cladding 1. The ceiling cladding 1, the carrier plate 4 and the illuminating means 2 form an easy-to-assemble unit.

The inner ceiling assembly illustrated in the figure is arranged between side walls 12 of the rail-borne vehicle in such a manner that on both sides of the ceiling cladding 1 there are gaps 13 between the inner faces of the side walls 12 of the rail-borne vehicle and the ceiling cladding 1. Some illuminating means 14 and also some air outlet openings 15 of the air ducts 9 are arranged with respect to the gaps 13 in such a manner that both air from the air ducts 9 and also light from the illuminating means 15 pass through the gaps 13. The inner compartment of the rail-borne vehicle below the ceiling cladding 1, in particular a passenger compartment, is consequently illuminated indirectly. The gaps 13 are regarded as openings of the ceiling cladding.

FIG. 2 illustrates a cross-sectional view of a further inner ceiling assembly in accordance with the invention for a rail-borne vehicle. Said assembly comprises a ceiling cladding 1, a frosted glass pane 7 and a carrier plate 4 that comprises illuminating means 2, 14 and these components are combined to form an easy-to-assembly unit. In particular LEDs are used as the illuminating means 2, 14. Some of said illuminating means are arranged on the carrier plate extensions 6 in order to further influence the intensity of the illumination of the rail-borne vehicle or to facilitate the assembly of the illuminating means 2, 14 on the carrier plate 4. The carrier plate 4 is coated with a light-reflecting material on its face 3 that is facing the ceiling cladding 1 and this increases the amount of illumination achieved. The frosted glass pane 7 is permeable to light but otherwise impermeable and is arranged between the illuminating means 2 and the ceiling cladding 1. The illuminating means 2 emit light in the direction of the frosted glass pane 7. The light from the illuminating means 2 is transmitted through the frosted glass pane 7 to the ceiling cladding 1. However, said frosted glass pane prevents the direct view into the illuminating means 2 from the inner compartment of the rail-borne vehicle. The illuminating means 14 are arranged on the carrier plate extensions 6 in such a manner that they emit light only indirectly into the inner compartment of the rail-borne vehicle.

The illumination means point in the direction of the air guiding sheets 8 that are used to convey the air from an air duct. The air guiding sheets 8 form air guiding elements 5 together with the outer faces of the carrier plate 4 that are lying opposite said air guiding sheets. The figure does not illustrate the air duct that is arranged above the carrier plate 4 and comprises air outlet openings that convey air from the air duct into the air guiding elements 5 of the inner ceiling arrangement. Two further air guiding elements 5 convey air from the air duct between the frosted glass pane 7 and the ceiling cladding 1. In addition, openings are provided in the frosted glass pane 7 to enable the passage of air from the air duct 9 and these air guiding elements 5 pass through said openings.

The ceiling cladding 1 is perforated but this is not directly evident in FIG. 2. The air from the air outlet openings of the air duct, said air being conveyed by means of the air guiding elements 5 between the frosted glass pane 7 and the ceiling cladding 1 and also the light from the illuminating means 2 consequently passes through the openings of the ceiling cladding 1.

The invention claimed is:

1. A rail-borne vehicle, comprising:
   a vehicle roof having an inner face;
   an inner ceiling assembly having components including at least one air duct, a multiplicity of illuminating devices and at least one ceiling cladding;
   said at least one air duct being disposed between said inner face of said vehicle roof and said at least one ceiling cladding and said at least one air duct having a multiplicity of air outlet openings;
   said at least one ceiling cladding having a multiplicity of openings;
   said multiplicity of illuminating devices being disposed between said inner face of said vehicle roof and said at least one ceiling cladding; and
   both said multiplicity of illuminating devices and also said multiplicity of air outlet openings in said at least one air duct being disposed with respect to said multiplicity of openings in said at least one ceiling cladding to cause both air from said at least one air duct and also light from said multiplicity of illuminating devices to pass through said multiplicity of openings in said at least one ceiling cladding.

2. The rail-borne vehicle according to claim 1, wherein said multiplicity of openings in said at least one ceiling cladding are uniformly distributed over said at least one ceiling cladding.

3. The rail-borne vehicle according to claim 1, which further comprises a carrier plate disposed between said at least one air duct and said at least one ceiling cladding, said carrier plate having openings conveying air from said multiplicity of air outlet openings in said at least one air duct and said carrier plate supporting said multiplicity of illuminating devices.

4. The rail-borne vehicle according to claim 3, wherein said carrier plate and said at least one ceiling cladding are spaced apart by at least 10 mm.

5. The rail-borne vehicle according to claim 1, which further comprises a frosted glass pane disposed between said multiplicity of illuminating devices and said at least one ceiling cladding.

6. The rail-borne vehicle according to claim 1, which further comprises:
   a compartment disposed below said at least one ceiling cladding, said compartment being illuminated by said multiplicity of illuminating devices;
   said multiplicity of illuminating devices being disposed with respect to said multiplicity of openings in said at least one ceiling cladding to predominantly indirectly illuminate said compartment.

7. The rail-borne vehicle according to claim 1, which further comprises:
   a vehicle side wall having inner faces;
   at least one of said inner faces of said vehicle side wall and said at least one ceiling cladding forming a gap therebetween; and
   both said multiplicity of illuminating devices and also said multiplicity of air outlet openings in said at least one air duct being disposed with respect to said gap to cause both air from said at least one air duct and also light from said multiplicity of illuminating devices to pass through said gap.

8. The rail-borne vehicle according to claim 1, wherein said at least one ceiling cladding and said multiplicity of illuminating devices form a mountable unit.

9. The rail-borne vehicle according to claim 1, wherein said multiplicity of openings in said at least one ceiling cladding direct air from said at least one air duct downward into an inner compartment of the rail-borne vehicle below said at least one ceiling cladding.

* * * * *